United States Patent [19]

Saito

[11] 4,058,099

[45] Nov. 15, 1977

[54] AIR CLEANER ASSEMBLY

[75] Inventor: Taiji Saito, Toyoto, Japan

[73] Assignee: Toyota Jidosha Kogyo Kabushiki Kaisha, Japan

[21] Appl. No.: 652,169

[22] Filed: Jan. 26, 1976

[30] Foreign Application Priority Data

Nov. 12, 1975 Japan .............................. 50-135225

[51] Int. Cl.$^2$ .......................................... F02M 31/00
[52] U.S. Cl. ........................ 123/122 D; 55/DIG. 28
[58] Field of Search ..... 123/122 D; 55/276, DIG. 28, 55/419

[56] References Cited

U.S. PATENT DOCUMENTS

| 1,828,816 | 10/1931 | Pierson | 55/DIG. 28 |
|---|---|---|---|
| 2,781,032 | 2/1957 | Sebok | 123/122 D |
| 2,896,742 | 7/1959 | McMichael | 55/276 |
| 3,574,988 | 4/1971 | Buckman | 123/122 D |
| 3,918,421 | 11/1975 | Berry | 123/122 D |

Primary Examiner—Ronald H. Lazarus
Attorney, Agent, or Firm—Toren, McGeady and Stanger

[57] ABSTRACT

An air cleaner assembly includes an intake pipe which is provided with a switching valve means adapted to selectively effect through the intake pipe flow of either cool air or warm air. The assembly includes a joint tube, which is secured to the casing of the assembly within which an air cleaning element is housed, with part of the joint tube being in engagement with a part of the intake pipe in a telescopic relationship therewith. A resilient sealing material is sandwiched between a wall of the joint tube and the corresponding wall of the intake tube at the telescopic interconnection therebetween. The casing of the air cleaner assembly and the intake pipe are mounted by means of stays securing these elements to suitable parts of an internal combustion engine.

6 Claims, 3 Drawing Figures

AIR CLEANER ASSEMBLY

BACKGROUND OF THE INVENTION

The present invention relates generally to the structural composition of an air cleaner assembly and more particularly to an assembly which includes an intake pipe provided with switching valve means for selectively directing flow of cool air or warn air through the intake pipe.

An air cleaner assembly is known in which a switching valve is provided within an intake pipe for reducing the quantities of harmful components contained in exhaust gases. However, the intake pipe of this type of air cleaner involves considerable weight, and hence if the intake pipe is supported by means of the casing of the air cleaner in a cantilevered fashion, then the intake pipe will tend to cause resonance due to vibrations transmitted thereto from external sources. In an intake pipe having considerable weight, the vibration is then transmitted to the body of the casing of the cleaner, thereby creating noise from the intake pipe and the casing which involves a large surface area.

Additionally, major sources of noise caused by vibration may include a connecting portion which extends between a valve body and a valve stem of the switching valve which is mounted within the intake pipe. A further source of such noise from vibration is the contacting portion between the valve body and the intake pipe. Thus, there results a considerable degree of wear in the aforementioned contacting portions.

In order to cope with these problems, there has been proposed a construction for an air cleaner in which the intake pipe is connected to a joint tube secured to the casing body of the cleaner by means of a rubber tube in such a manner that the rubber tube is fitted on the intake pipe at one of its ends and on the joint tube at the other end. The connecting portions of the rubber tube are tightened by means of annular bands extending therearound at the connected ends. However, such an air cleaner construction poses shortcomings in that the rubber tube is liable to be bent at its joint portion to the intake pipe so that there arises difficulty in attaching the air cleaner in position in that the rubber tube is sometimes collapsed due to vacuum or negative pressure prevailing therein. This tends to produce disadvantages in that there tends to occur an increase to the resistance of flow of intake air and that it requires a larger number of superfluous parts, such as the annular bands which must be tightened around the pipe or tube.

The present invention is intended to overcome the aforementioned disadvantages by providing an air cleaner having an intake pipe wherein the structure of the air cleaner prevents or suppresses vibration and hence reduces noise in the intake pipe while at the same time providing a device having a simplified construction.

Furthermore, the present invention is directed toward providing an cleaner having an intake pipe without requiring a rubber tube which is connected between the intake pipe and the joint tube secured to the casing of the air cleaner with the rubber tube extending in an unsupported condition. The invention avoids bending or collapse of the rubber tube and increases in resistance to the flow of intake air passing therethrough thus facilitating attachment of the cleaner.

In addition, the invention provides an air cleaner having a longer service life.

SUMMARY OF THE INVENTION

Briefly, the present invention may be described as comprising an air cleaner assembly including an intake pipe which is provided with switching valve means adapted to selectively effect flow of cool air or warm air through the intake pipe. The cleaner assembly includes a joint tube secured to the casing of the cleaner which houses an air cleaning element therein. Part of the joint tube is in engagement with a part of the intake pipe in a telescopic relationship. That is, the parts of the joint tube and of the intake pipe which are in engagement are arranged in a coaxial relationship with one part extending to within the other part with a resilient material, such as rubber, being sandwiched in airtight engagement between the interfitting parts of the intake pipe and of the joint tube at the aforemnetioned telescopic joint portion. Additionally, the casing of the air cleaner and the intake pipe may be suitably secured by means of stays or the like to appropriate parts of an internal combustion engine with, for example, the intake pipe being mounted upon a cylinder head cover of the engine while the air cleaner casing is mounted to the exhaust manifold of the engine.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive material in which there is illustrated and described a preferred embodiments of the invention.

DETAILED DESCRIPTION OF THE PREFERRED EMBODIMENT

Figure 1:
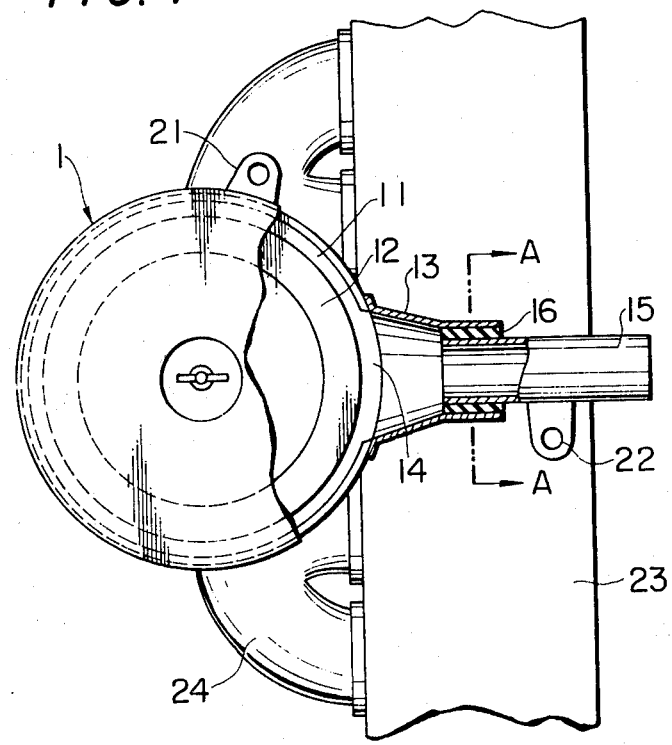
FIG. 1 is a plan view partially broken away showing an air cleaner assembly constructed in accordance with the present invention.

Referring now to the drawing, there is shown an embodiment of an air cleaner assembly according to the present invention which includes an air cleaner 1 having a casing 11 within which there is housed an air cleaning element 12. An opening 14 is defined in the peripheral wall of the casing 11 and a joint tube 13 is secured to the portion of the casing surrounding the opening 14 by means of welding or the like with the tube 13 extending to completely cover the opening 14.

As best seen in FIG. 1, an intake pipe 15 is arranged with one end thereof inserted into the joint tube 13 in telescopic relationship. That is, it will be seen that the interfitted portions of the intake pipe 15 and of the joint tube 13 are arranged in a coaxial spaced relationship with the intake pipe 15 extending to within the connected portion of the joint tube 13.

Figure 1A:
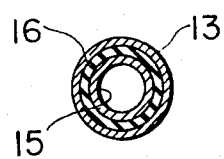
FIG. 1a is a cross-sectional view taken along the line A—A of FIG. 1.

A resilient member 16 having an annular configuration and preferably formed of rubber is sandwiched in airtight engagement between the outer wall of the intake pipe 15 and the inner wall of the joint tube 13 across the parts thereof which are arranged in interengaging relationship. As best seen in FIG. 1a, the resilient member 16 comprises an annular configuration extending completely about the engaging part of the intake pipe 15 with the outer wall of the resilient member 16 being tightly fitted inside of the engaging part of the joint tube 13 so that an airtight seal is created.

In the embodiment depicted in the drawing, the diameter of the joint tube 13 is shown as being larger than the diameter of the intake pipe 15 and the intake pipe is fitted to extend to within the joint tube 13. However, it will be apparent that a reversed arrangement is possible wherein the diameter of the intake pipe may be made larger than the diameter of the joint tube with the joint tube being fitted within the intake pipe. In either case, a resilient member such as the member 16 is fitted between the engaging walls of the intake pipe and the joint tube.

The casing body 11 and the intake pipe 15 are formed, respectively, with stays 21 and 22, which may comprise any appropriate form of mounting element such as an eyelet depicted in the drawing, in order to connect the casing 11 and the intake pipe 15 with a cylinder head cover 23 or a manifold 24, or with stays secured upon these members.

Figure 2:
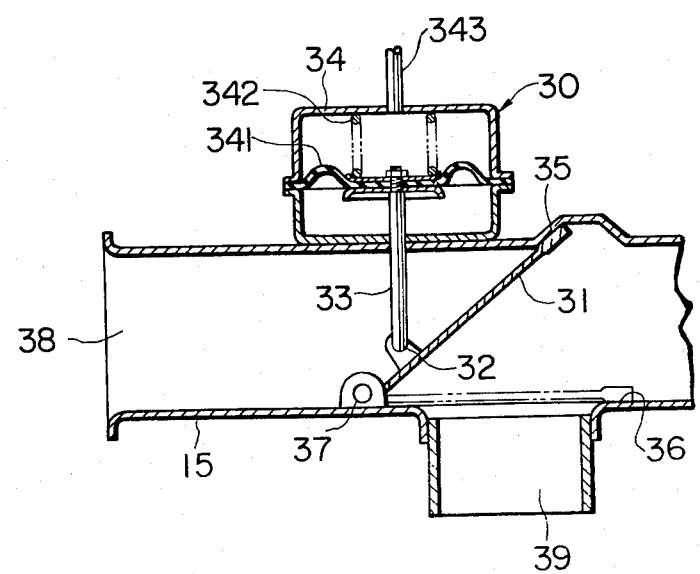
FIG. 2 is a longitudinal cross-sectional view of an intake pipe having switching valve means therein.

FIG. 2 shows a switching valve means 30 mounted on the intake pipe 15. The intake pipe 15 includes two inlets 38 and 39, with the inlet 38 being in flow communication with an engine chamber and adapted to introduce cool air therethrough from a source of such cool air. The inlet 39 is adapted to introduce therethrough warm air from an exhaust manifold of the internal combustion engine. The cool air or warm air may be fed into the casing 11 selectively or concurrently.

The switching valve means includes a valve body 31 secured to a diaphragm 341 disposed within a diaphragm casing 34. The diaphragm 341 is so designed as to be deflected against the force of a spring 342 as a result of vacuum or negative pressure developed through a pipe 343. The application of vacuum may be controlled by means of a bimetallic device (not shown) located within the casing 11.

The valve body 31 is pivotally mounted to the intake pipe by a pivot joint 37 and a stem 33 extends between the valve body 31 and the diaphragm 341. It will be apparent that deflection of the diaphragm 341 will move the stem 33 to cause pivotal movement of the valve body 31 about the pivot joint 37 in order to thereby open and close the cool air inlet 38 and the warm air inlet 39. As shown in FIG. 2, with the valve body 31 in its position shown in solid line, the warm air inlet 39 is opened and the cool air inlet 38 is closed. In the position of the valve body shown in dotted form, a reversed switching is depicted.

The vibration which is transmitted through the stay 22 or through the joint tube 13 to the intake pipe 15 is generally slight. The main sources of noise or vibration in prior art cleaners, as has been described previously herein, are usually the contacting portions between the intake pipe and the valve body, for example the point 35 where the valve body 31 contacts the inner wall of the intake pipe 15, the point 36 where the valve body 31 contacts the opposite wall of the intake pipe 15 and the pivot joint 37. Furthermore, the connecting portion 32 between the valve stem 33 and the valve body 31 may also comprise a significant source of noise from vibration.

However, in view of the construction of the present invention only slight noise will be experienced with an intake pipe 15 structured in accordance with the teachings of the invention. The vibration in the intake pipe 15 will be effectively absorbed by means of the resilient member 16, which is preferably made of rubber, so that little or no vibration will be transmitted to the casing 11.

Thus, it will be seen that as a result of the present invention not only is there avoided a situation wherein an unsupported resilient or flexible tube must be connected between air flow members of the device but an arrangement is provided wherein a firm airtight mounting may be simply provided while at the same time suppression of noise and vibration is enhanced.

While a specific embodiment of the invention has been shown and described in detail to illustrate the application of the inventive principles, it will be understood that the invention may be embodied otherwise without departing from such principles.

What is claimed is:

1. An air cleaner assembly comprising a casing having an air cleaning element therein, intake pipe means connected to both a source of warm air and a source of cool air, switching valve means carried by said intake pipe means for selectively directing either warm air or cool air through said intake pipe means from said sources of said air, a joint tube secured at one end thereof to said casing and having its other end connected with said intake pipe in telescoping relationship therewith, said joint tube providing communication between said intake pipe means and the interior of said casing for introducing air from said intake pipe into said casing, and a resilient sleeve member carried at said other end of said joint tube positoned interiorly within one of said telescoping members and surrounding the other said telescoping member extending axially along the area of telescoping overlap and being sandwiched in airtight engagement between said joint tube and said intake pipe.

2. An assembly according to claim 1 wherein said resilient member is essentially formed of rubber.

3. An assembly according to claim 1 wherein said air cleaner assembly is mounted upon an internal combustion engine, said assembly further including stays mounting said air cleaner casing and said intake pipe upon said internal combustion engine.

4. An assembly according to claim 3 wherein said internal combustion engine includes a cylinder head cover and wherein said stays are arranged to mount said intake pipe upon said cylinder head cover.

5. An assembly according to claim 3 wherein said internal combustion engine includes an exhaust manifold and wherein said stays are arranged to mount said air cleaner casing upon said exhaust manifold.

6. An assembly according to claim 1 wherein said joint tube is formed with a diameter larger than the diameter of said intake pipe, with said intake pipe being mounted to extend to within said joint tube in coaxial relationship therewith.

* * * * *